United States Patent [19]

Goodson et al.

[11] 4,092,256
[45] May 30, 1978

[54] MAGNETIC COATING COMPOSITIONS

[76] Inventors: Keith S. Goodson, 14700 E. Hills Dr., San Jose, Calif. 95127; Duncan W. Frew, 1200 Memorex Dr., Santa Clara, Calif. 95052

[21] Appl. No.: 753,537

[22] Filed: Dec. 22, 1976

[51] Int. Cl.$^2$ .................... H01F 1/28; G11B 5/70; C04B 35/00
[52] U.S. Cl. .................................... 252/62.54
[58] Field of Search .................................... 252/62.54

[56] References Cited

U.S. PATENT DOCUMENTS

| | | | |
|---|---|---|---|
| 3,470,021 | 9/1969 | Hendricx et al. | 252/62.54 X |
| 3,926,826 | 12/1975 | Graham et al. | 252/62.54 |
| 3,929,658 | 12/1975 | Beske | 252/62.54 |
| 4,020,236 | 4/1977 | Aonuma et al. | 428/457 |
| 4,025,694 | 5/1977 | Pletcher et al. | 428/480 |

FOREIGN PATENT DOCUMENTS

| | | | |
|---|---|---|---|
| 4,123 | 2/1975 | Japan | 252/62.54 |

Primary Examiner—F.C. Edmundson

[57] ABSTRACT

A coating composition for use in the preparation of magnetic recording media is described. The composition contains finely divided magnetic particles dispersed in an organic solvent, containing in solution a hydroxyl group containing polymer having an OH number between about 100–500, a polyether urethane elastomer, an aliphatic polyisocyanate and a copper containing chelate catalyst, the organic portion of said chelate being of the general chemical structure

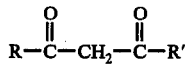

wherein R and R' can be the same or different and represent alkyl groups containing 1–18 carbon atoms and aromatic groups, both substituted and unsubstituted.

12 Claims, No Drawings

MAGNETIC COATING COMPOSITIONS

BACKGROUND OF THE INVENTION

This invention relates to a novel magnetic recording media wherein a support or backing material in the form of a tape, disc, belt or the like is provided with a synthetic resin binder having finely divided magnetic particles dispersed therein.

The magnetic recording media are commonly prepared by coating a support with a dispersion of finely divided magnetic particles in an organic solvent containing in solution a resinous or polymeric binder and then vaporizing the solvent to leave the finely divided magnetic particles dispersed in the binder which overlays the support surface. A considerable effort has gone into the development of the binder system. While it has been recognized that none of the binder systems have proved ideal, it has also been noted that the most useful binders are combinations of semi-rigid polymers modified with various elastomers. One such system consists in the main of a phenoxy resin, and a polyurethane elastomer made by reacting a diisocyanate such as methylene di-P-phenyl diisocyanate with a polyester diol made from adipic acid and 1,4-butanediol. This binder system has been improved by crosslinking the phenoxy resin component through its hydroxyl groups by reaction with a polyisocyanate.

Binder systems of this character commonly have had a number of disadvantages. The coating compositions incorporating these binder systems have had relatively short pot lives, i.e., the coating mixture increases in viscosity as it stands so that a substantial increase in viscosity of the coating composition commonly occurs before all of it has been applied to a support surface. This means that there is difficulty in maintaining uniformity in the product due to the rising viscosity of the coating composition and also that portions of a batch of the coating composition must be discarded due to increased viscosity especially when delays in applying it to the support surface are encountered in the manufacturing operation. A second disadvantage in binder systems of this type is that they have had serious post curing tendencies. During the manufacturing operation, the support material is coated with the magnetic coating composition and the coated support is then subjected to a heat treatment which causes evaporation of the solvent and speeds up the crosslinking action of the polyisocyanate component of the coating mixture. It is often found that at the end of the heat treatment the binder system contains a substantial quantity of unreacted isocyanate groups and that after the heat treatment has been completed, the crosslinking reaction continues at a slower rate with the result that the coating becomes so rigid that the subsequent necessary surface treating of the recording medium product, as by calendaring, becomes difficult or impossible especially if this step is for any reason delayed.

Futhermore, prior magnetic tape coatings made with polyester urethanes have demonstrated a high friction quality which is most disadvantageous when considering the abrasion stresses imposed by moving head recorders and high speed transports used in data recording today. Also, prior coating compositions have exhibited a rather poor dispersion quality, i.e., the ability to uniformly disperse the finely divided magnetic particles and other particulate matter traditionally employed in magnetic tape compositions.

Accordingly, it is an object of the present invention to reduce the difficulties encountered with prior art binder systems as outlined above.

A further object of the present invention is to produce a novel magnetic tape formulation which exhibits lower frictional characteristics and improved product uniformity and processability than magnetic tape formulations of the prior art.

A still further object of the present invention is to produce a polyurethane-based magnetic tape formulation possessing the superior pigment loading and abrasion resistance characteristically associated with polyurethane binders while substantially eliminating the undesirable high coefficients of friction normally associated with prior polyurethane binders.

These advantages can be realized by preparing a magnetic coating composition containing magnetic particles dispersed in an organic solvent, containing in solution a hydroxyl group containing polymer having an OH number between 100-500, a polyether urethane elastomer, an aliphatic polyisocyanate and a copper containing chelate catalyst, the organic portion of said chelate being of the general chemical structure

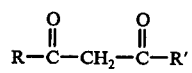

wherein R and R' can be the same or different and represent alkyl groups containing 1–18 carbon atoms and aromatic groups, both substituted and unsubstituted. Furthermore, the pot life of the above-recited composition can be extended by incorporating in the solution a small amount of an aliphatic diketone having the formula R—CO—CH$_2$—CO—R' wherein R and R' can be the same or different and are saturated aliphatic groups.

The aliphatic polyisocyanate acts as a crosslinking agent. The aliphatic polyisocyanate which can be used in practicing the present invention would depend upon the desired reaction rate, the length of oven curing, coating temperature, coating speed and acceptable pot life. It has been found that a particularly good crosslinking agent is represented by the following formula:

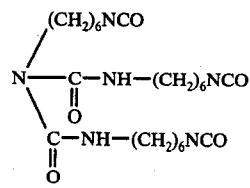

This polyisocyanate is commerically available from Mobay Chemical Co. under the trademark DESMODUR N-75.

The catalyst useful in practicing the present invention is a copper containing chelate, the organic portion of said chelate being of the general chemical structure:

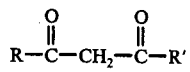

where R and R' can be the same or different and each represent alkyl groups containing 1–18 carbon atoms and aromatic groups, both substituted and unsubstituted. For example, it has been found that acceptable catalysts useful in practicing the present invention are copper acetylacetonate and benzoylacetonate.

As stated previously, the pot life of a coating composition can be extended by optionally including a small amount of an aliphatic diketone of the general formula:

R—CO—CH$_2$—CO—R' wherein R and R' are the same or different and are saturated aliphatic groups containing 1 to 5 carbon atoms. 2,4-pentanedione is the preferred diketone because of its relatively high volatility which permits it to be driven from the surface of the coated tape very quickly during the heat curing step and so permit the crosslinking reaction to proceed rapidly, although other diketones could also be used.

The present invention further contemplates replacement of the conventional polyester urethane with a polyether urethane elastomer. Typical of the polyether urethane elastomers useful in practicing the present invention is one that is available from Uniroyal Chemical under the trademark ROYLAR 863 made from polytetramethylene glycol, methylene diphenylisocyanate and 1,4-butanediol and has the following characteristics:

| | |
|---|---|
| Specific Gravity | 1.14 |
| Hardness (Durometer, Shore A) | 85 (Injection molded)/83 (Extruded) |
| Tensile Strength (psi) | 5900 Injection molded 2"/min. |
| | 4100 Injection molded 20"/min. |
| | 7200 Extruded 2"/min. |
| | 5900 Extruded 20"/min. |
| Brittle Point (ASTM D-746 | <−80 (Injection molded, 20"/min) |
| Taber Abrasion (Mg/1000 rev. H-18 Wheel 1000 gm load) | 53 mg |

Such polyether urethane elastomers exhibit better friction characteristics than prior art polyeter urethanes. One such hypothesis is that this is due to a higher durometer (stiffness) which is controlled by the methylene diphenylisocyanate and 1,4-butanediol concentrations and molecular weight. Friction in rubber and to a large extent in polyurethanes is related to stiffness and rebound which is a measure of hysteresis loss. The lower stiction of the polyether urethane elastomers is due to a higher stiffness and a lower rebound. Furthermore, the relative absence of intermolecular attractions in polyether urethane elastomers results in improved dispersion quality due to the high molecular-weight of the resin, increased shear susceptibility of the dispersion and low friction characteristics.

For reaction with the polyisocyanate component, a hydroxyl group containing polymer having an OH number between about 100–500 is employed. It has been found that phenoxy resins having the following structure:

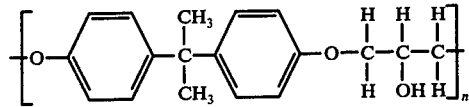

wherein n is an integer from about 80 to 120, can be used to practice the present invention. This is a thermoplastic high molecular weight polymer product made from the reaction of Bisphenol A and epichlorohydrin. Also found to be adequate as a source of the hydroxyl group containing polymer is a vinylacetate-vinyl butyral copolymer available from Monsanto Co. and known as BUTVAR.

The crosslinking reaction of the polyisocyanate is rapid and specific. When DESMODUR N-75 is used, the quantity of polyisocyanate required for crosslinking is less than half of that which must be used then many other commerically available polyisocyanates are employed. Further, it may be noted that the quantity of residual unreacted isocyanate groups contained in the binder system at the end of the heat curing step is very low and this low level of residual isocyanate groups tends to minimize post-curing tendencies.

A magnetic coating composition having the following components in the indicated amounts was prepared.

| Material | Percent by Weight |
|---|---|
| Polyether Urethane Elastomer | 5.498 |
| Phenoxy Resin | 1.375 |
| Copper Acetylacetonate | 0.042 |
| DESMODUR N-75 (polyisocyanate) | 0.336 |
| 2,4-Pentanedione | 0.095 |
| Magnetic Iron Oxide | 20.724 |
| Cyclohexanone Solvent | 68.596 |
| | 96.666 |

Remainder consisting of additives commonly used to enhance processibility and product life.

The coating composition containing the above-identified components in the indicated proportions was prepared by mixing the iron oxide, approximately two-thirds of the solvent, and approximately half of the polyether urethane elastomer together and subjecting the mixture to extended miling to disperse and suspend the solid materials in the solvent. The remainder of the polyether urethane elastomer and the phenoxy resin was then added, and the resultant mixture was subjected to further milling until a stable suspension of the solid material in the liquid was obtained.

A polyethylene-terephthalate film was coated with the mixture, subjected to particle orientation, heat cured at 70°–110° C., and then surface treated by calendering.

Magnetic recording tape prepared in this manner exhibits no significant tendency to post curing. Pilot line samples were withdrawn and retained for 21 hours between the heat curing and the surface treating steps. After this time lapse, no post-curing hardening effects were observed, and the surface treating step proceeded without difficulty.

The pot life of the above-described coating composition is approximately 20 hours. If the diketone were omitted from the composition, pot life would be on the order of 1 to 2 hours.

In addition to the previously described components which include solvent, magnetic particles, polyether urethane elastomer, a hydroxy group containing polymer having an OH number between about 100–500, a copper chelate, an aliphatic polyisocyanate and preferably a diketone, it is conventional to add other materials. These additonal additives which are used in minor proportions are employed to contribute to life or ease of use of the finished tape. Conductive agents, usually conductive carbon, may be added to avoid build-up of static charges. Dispersants such as zinc naphthenate, dioctyl sodium sulfonate, lecithin, lignin sulfonic acids and the like may be added to stabilize the suspension of iron oxide in the coating composition and lubricants such as silicone oils or higher fatty acid esters are commonly added to lubricate the dried coating. Furthermore, small amounts of a hard finely divided abrasive solid such as silicon carbide or alumina may be added to improve the durability of the finished tape The polyisocyanate, preferably DESMODUR N-75 abovedescribed, enters into the crosslinking reaction quite rapidly and completely with the result that there are few unreacted isocyanate groups in the coating if the concentration levels are properly selected. This polyisocyanate is used at a concentration which provides a ratio of OH groups in the hydroxyl group containing polymeric resin to NCO groups in the polyisocyanate above 3.5 and in the range of 3.5 to 6.0. At OH/NCO ratios in this range, no significant post-curing problem is encountered.

The content of the diketone may be expressed in terms of weight percent as above indicated but may also and more generally be expressed in terms of mol ratio of diketone to copper chelate catalyst since there is considerable variation in the molecular weights of these catalysts. In terms of mol ratio, at least 3 mols of diketone per mol of copper chelate, normally cupric acetylacetonate, should be used. Generally, the diketone/catalyst mol ratio should be in the range of approximately 3 to 20. Larger amounts of diketone can be used without adverse effect upon the coating composition but no noticeable benefit attends the use of such larger amounts.

The cyclohexanone solvent shown in the example is attractive economically and functionally, but a number of alternate organic solvents may be employed such as methyl ethyl ketone, dioxane, methyl isobutyl ketone, tetrahydrofurane, N-dimethyl formamide and aromatic hydrocarbons such as toluene or xylene, usually mixed with ketone. The solvent usually makes up 60—80% by weight of the total composition.

The extended pot lives of the compositions of the invention provide flexibility and efficient operation in coating of magnetic recording surfaces and the absence of post-curing insures uniformity in the quality of the finished recording medium.

Acceptable coating compositions are obtained when proportions of the essential components of the composition are varied from those shown in the above table within the following approximate ranges. The polyether urethane elastomer content of the composition can be varied in the range of about 2 to 10% by weight of the total composition, the hydroxy group containing polymeric resin content of the coating composition can be varied in the range of about 0.5 to 5.0% by weight of the total composition, the copper chelate content can be varied within the range of about 0.01 to 0.06% by weight of the total composition, the polyisocyanate component can be varied within the range of about 0.2 to 0.8% by weight of the total composition, the diketone component can be varied within the range of about 0.05 to 0.25% by weight of the total composition, and the magnetic particle content can be varied in the range of about 10 to 25% by weight of the total composition.

What is claimed is:

1. A coating composition for use in the preparation of magnetic tapes comprising finely divided magnetic particles dispersed in an organic solvent containing in solution 2 to 10% by weight of a polyether urethane elastomer resin; 0.5 to 5% by weight of a hydroxy group containing polymer having an OH number between about 100-500; 0.01% to 0.06% by weight of a copper containing chelate catalyst, the organic portion of said chelate being of the general formula

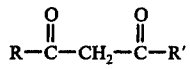

wherein R and R' can be the same or different and represents alkyl groups containing 1-18 carbon atoms and aromatic groups, both substituted and unsubstituted; and 0.2 to 0.8% by weight of an aliphatic polyisocyanate.

2. The coating composition of claim 1 wherein said composition further comprises from about 3 to 20 mols of a diketone having the formula R—CO—CH$_2$—CO—R', wherein R and R' are the same or different and are saturated aliphatic groups, per mol of the copper chelate catalyst.

3. The coating composition as defined in claim 2 wherein said diketone is 2,4-pentanedione.

4. The coating composition as defined in claim 1 wherein said hydroxyl group containing polymer is a phenoxy resin having the formula

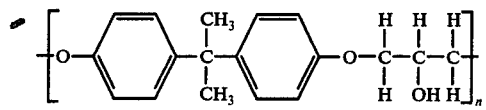

wherein n is in the range of about 80 to 120.

5. The coating composition as defined in claim 1 wherein said hydroxyl group containing polymer is a vinylacetatevinyl butyral copolymer.

6. The coating composition of claim 1 wherein the aliphatic polyisocyanate has the following formula

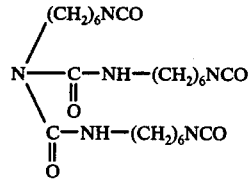

7. The coating composition of claim 1 wherein said copper chelate catalyst is copper acetylacetonate.

8. The coating composition of claim 1 wherein said copper chelate catalyst is copper benzoylacetonate.

9. The coating composition of claim 1 wherein the ratio of OH groups contained in the hydroxy group containing polymer to the NCO groups contained in the aliphatic polyisocyanate is in the range of 3.5 to 5.

10. The coating composition of claim 9 wherein the hydroxy group containing polymer is a phenoxy resin having the formula

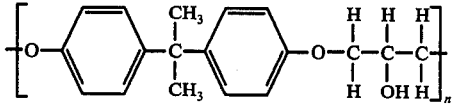

wherein n is in the range of about 80 to 120.

11. The coating composition of claim 2 wherein the diketone is present in an amount between about 0.05 and 0.25% by weight based upon the weight of the total composition.

12. The composition defined in claim 2 wherein the finely divided magnetic particles are present in an amount between 10 and 25% by weight based upon the weight of the total composition.